United States Patent
Freeman et al.

(10) Patent No.: US 7,421,079 B2
(45) Date of Patent: Sep. 2, 2008

(54) METHOD AND APPARATUS FOR SECURE KEY REPLACEMENT

(75) Inventors: William E. Freeman, Sykesville, MD (US); Mark A. Bellmore, Mt. Airy, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 846 days.

(21) Appl. No.: 10/729,943

(22) Filed: Dec. 9, 2003

(65) Prior Publication Data

US 2005/0123142 A1  Jun. 9, 2005

(51) Int. Cl.
*H04L 9/08* (2006.01)
(52) U.S. Cl. ............... 380/277; 380/278; 380/279; 380/282; 713/168; 713/176; 713/178; 726/22
(58) Field of Classification Search ........... 380/277
See application file for complete search history.

(56) References Cited

U.S. PATENT DOCUMENTS 5,680,458 A * 10/1997 Spelman et al. ........... 380/277
6,198,824 B1 * 3/2001 Shambroom ............. 380/279
6,240,187 B1 * 5/2001 Lewis .................... 380/282
6,886,096 B2 * 4/2005 Appenzeller et al. ....... 713/170
6,978,017 B2 * 12/2005 Wiener et al. ............. 380/30
7,024,553 B1 * 4/2006 Morimoto ................ 380/277
7,099,476 B2 * 8/2006 Chen et al. .............. 380/277
7,206,936 B2 * 4/2007 Aull et al. ................ 713/173
2003/0056099 A1 * 3/2003 Asanoma et al. ......... 713/172

OTHER PUBLICATIONS

Menezes et al., "handbook of Applied Cryptography", 1997, CRC Press, pp. 506-515.*

* cited by examiner

Primary Examiner—Gilberto Barron, Jr.
Assistant Examiner—Minh Dinh
(74) Attorney, Agent, or Firm—Andrews Kurth LLP

(57) ABSTRACT

A method, and a corresponding apparatus, provide for remote, secure replacement of private keys in a private key infrastructure. The method is implemented as a secure key replacement protocol (SKRP), which includes the steps of receiving a rekey request, where the rekey request identifies a private key for replacement, authenticating the rekey request, replacing the identified private key with a SKRP key, signing the challenge with the SKRP key, and returning the signed challenge. The rekey request includes the SKRP key and the challenge.

23 Claims, 9 Drawing Sheets

METHOD AND APPARATUS FOR SECURE KEY REPLACEMENT

TECHNICAL FIELD

The technical field is public key infrastructure systems.

BACKGROUND

Public Key Infrastructure (PKI) systems were developed to ensure communications privacy, and to protect sensitive data. Each party in a PKI system has two cryptographic keys: a public key and a private key. A party's public key is available to any other party. A party's private key is never revealed to any other user. PKI systems are discussed in detail in "Secure Electronic Commerce," by Warwick Ford and Michael Baum, Prentice-Hall, ISBN 0-13-476342-4, which is hereby incorporated by reference in its entirety for its useful background information.

A serious problem encountered with PKI systems occurs when the need or desire exists to change a party's access privileges such as by modifying or removing the party's private key. This problem can be illustrated within the context of cryptographic file systems. Cryptographic file system may be used to control access to certain files on a computer system that is accessible by several individuals. The files to be controlled may be referred to as encrypted files. Once a party has had access to a particular set of encrypted files, there are several prior art approaches, none of which is convenient, for securely removing that access. These prior art approaches include: 1) changing the key-pair for the cryptographic file-set, 2) changing the symmetric encryption key for new writes, and 3) re-encrypting the entire file-set for which access rights have changed. Each of these approaches has drawbacks. Simply changing the key-pair that encrypts the symmetric file encryption key is not secure because no means exists for verifying that the party did not cache the symmetric file encryption key, which would allow access not only to previously stored information, but new information as well. Changing the symmetric encryption keys that are used for newly stored information provides some protection, but a party can still access all of the previously stored information in the cryptographic file-set. This solution has the additional disadvantage that there may eventually be many encryption keys needed to read a single file, which makes the system overly complex. The most secure solution is to re-encrypt the entire cryptographic file system when a party's access to the file-set is removed. While the most secure, this method is also very costly, especially if access rights change frequently. These and other access control problems are solved with a disclosed improved Secure Key Replacement Protocol (SKRP).

SUMMARY

What is disclosed is a secure key replacement protocol (SKRP), that includes the steps of receiving a rekey request, where the rekey request identifies a private key for replacement, authenticating the rekey request, replacing the identified private key with a SKRP key, signing the challenge with the SKRP key, and returning the signed challenge. The rekey request includes the SKRP key and the challenge.

Also disclosed is a method for secure replacement of private keys. The method includes the step of sending a rekey request to a user terminal, where the rekey request includes identifiers of one or more private keys to be replaced, secure key replacement protocol (SKRP) keys to replace the private keys, and a challenge to be signed at the user terminal. The method then includes the step of receiving the signed challenge.

Still further, what is disclosed is an apparatus that provides secure key replacement (SKR). The apparatus includes a receiving module that receives and processes a SKR request, where the SKR request includes an identity of a private key to be replaced, a SKR key to replace the private key, and a challenge that, when signed, indicates the private key is replaced with the SKR key, an authentication module that checks authenticity of the SKR request, a rekey module that replaces the private key with the SKR key and signs the challenge, and a return module that returns the signed challenge.

DESCRIPTION OF THE DRAWINGS

The detailed description will refer to the following drawings in which like numerals refer to like items, and in which.

DETAILED DESCRIPTION

PKI systems may be used to provide communications security and to protect file systems. For example, in a distributed computer system having a central server and several connected terminals, many users may have access to files stored on the server. Such a protected file system may be referred to as a cryptographic file system. To provide security for some or all of these files, the computer system may incorporate a PKI system. In an example, each user of the computer system may have a key pair assigned. The user's private key may be stored on a smart card or similar device. The smart card is inserted into an appropriate receptacle at the user's terminal. Software at the terminal, or alternatively at the server, reads the user's private key, and completes the authentication and authorization process.

Figure 1:
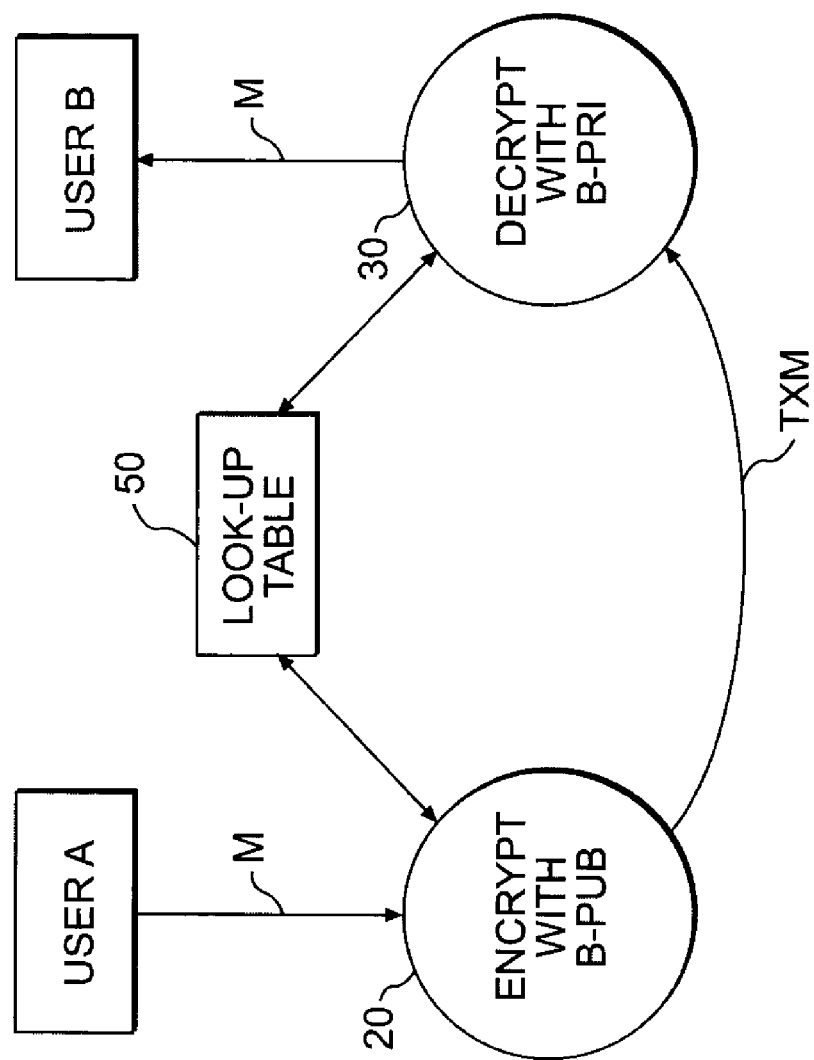
FIG. 1 illustrates a PKI-enabled communications system.

FIG. 1 illustrates PKI-enabled system 10, in which a sender, indicated by User A, and a receiver, indicated by User B wish to communicate. Specifically, User A wishes to send a message m to user B under a PKI system. In this PKI system, User B has a public key B-pub and a private key B-pri. The system 10 includes public key look-up table 50. The public key look-up table 50 includes, for each user, information such as a certificate serial number, a user name, and a public key. The certificate serial number typically is a numeric identifier that uniquely identifies a particular user. The user name may be an alphanumeric for conveniently identifying a user's entry. The public key in this example is 1,024 bits in length.

User A has a message m that is to be sent to User B. User A determines the public key B-pub of User B from public key look-up table 50. The unencrypted message m is encrypted by an encryption process 20 using the public key B-pub of User B. The encrypted message, suitable for transmission, is indicated by reference symbol txm. When User B receives txm, User B decrypts txm with a decryption process 30. The decryption process 30 uses the private key B-pri of User B. The private key B-pri of User B is known only to User B. The output from decryption process 30 is the decrypted message m. The content of decrypted message m from decryption process 30 is the same as the content of unencrypted message m produced by User A, as long as the message has not been altered during transmission. Encrypted message txm, which has been encrypted with B-pub, can be decrypted only with B-pri. Thus, encrypted message txm may be sent over any communications network without fear of the message being read by an unauthorized recipient.

The existence of public key look-up table 50 is not essential to a PKI system. For example, to establish secure communications, User A could simply ask User B directly for B-pub. Since B-pub is the public key of User B, User B may freely provide B-pub.

Thus, in a PKI system, a sender encrypts messages using the receiver's public key, and a receiver decrypts messages received using its own private key. If User B encrypts a message using B-pri, then the message can be decrypted only with B-pub.

Although User B may securely receive a message sent to User B, and be assured that no unauthorized parties could have read and understood the encrypted message in transit, User B cannot be certain of the source of the message. A message that states the message has been sent by User A might have been sent, instead, by User C masquerading as User A. To overcome this problem, PKI systems provide for digital signatures to prove the identity of the sender of a message. That is, the sender of a message signs the message with a digital signature, which proves that the message was sent by the sender and, moreover, that the message was not changed by another after the generation of the digital signature.

Figure 2:
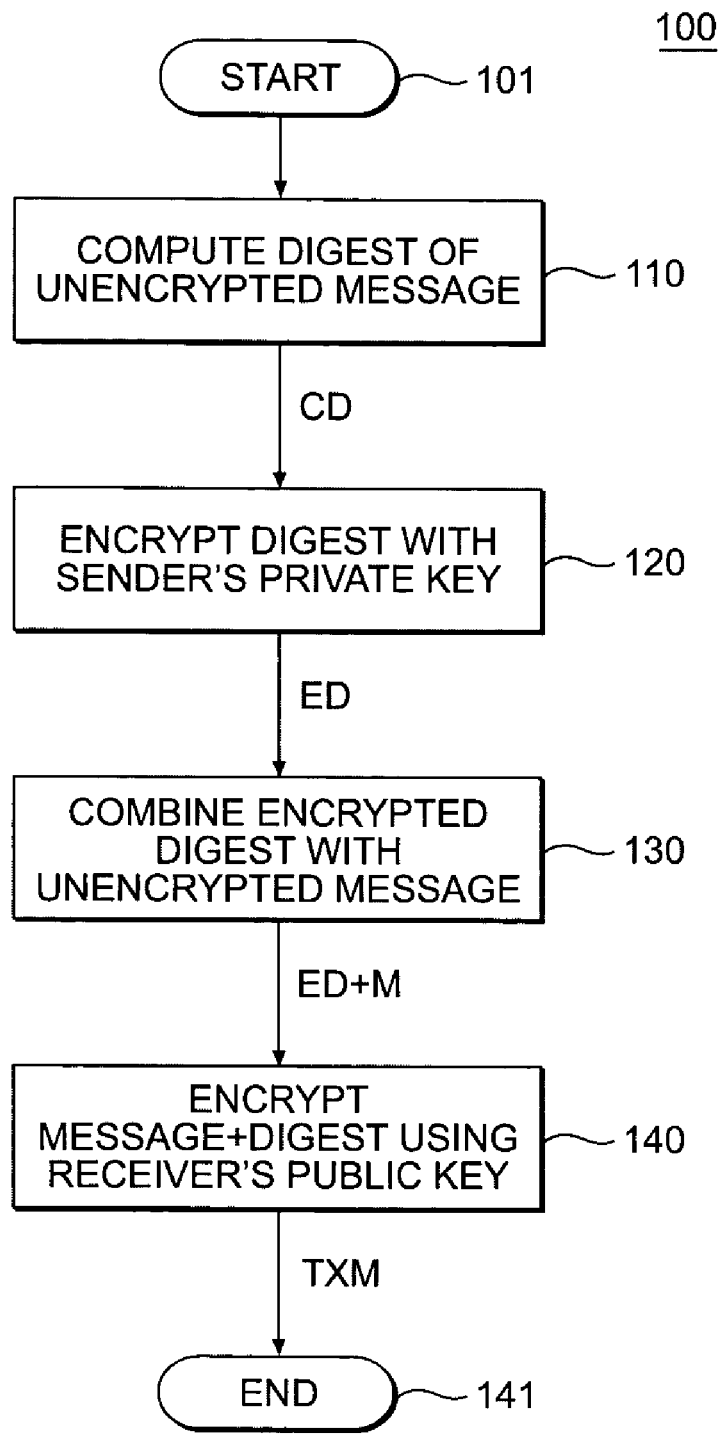
FIG. 2 is a flowchart of a process for generating a digital signature.

FIG. 2 is a flowchart of a process 100 for generating a digital signature. In a block 110, a digest, which is a numerical result similar to a hash function or checksum, is computed with respect to the message to be sent. The input to the digest computation step is the original message. The numerical result of applying the computation to the message may be referred to as a message digest. In FIG. 2, the output of step 110 is the computed digest, cd.

The computed digest cd is the input to block 120, in which the digest itself is encrypted, using the private key of the sender, to provide encrypted digest ed. In block 130, encrypted digest ed is combined with the unencrypted message m. In block 140, the combination of encrypted digest ed and message m is encrypted using the receiver's public key to provide an encrypted message txm. In this case, txm includes not only the original message but also the digital signature of the sender.

Figure 3:
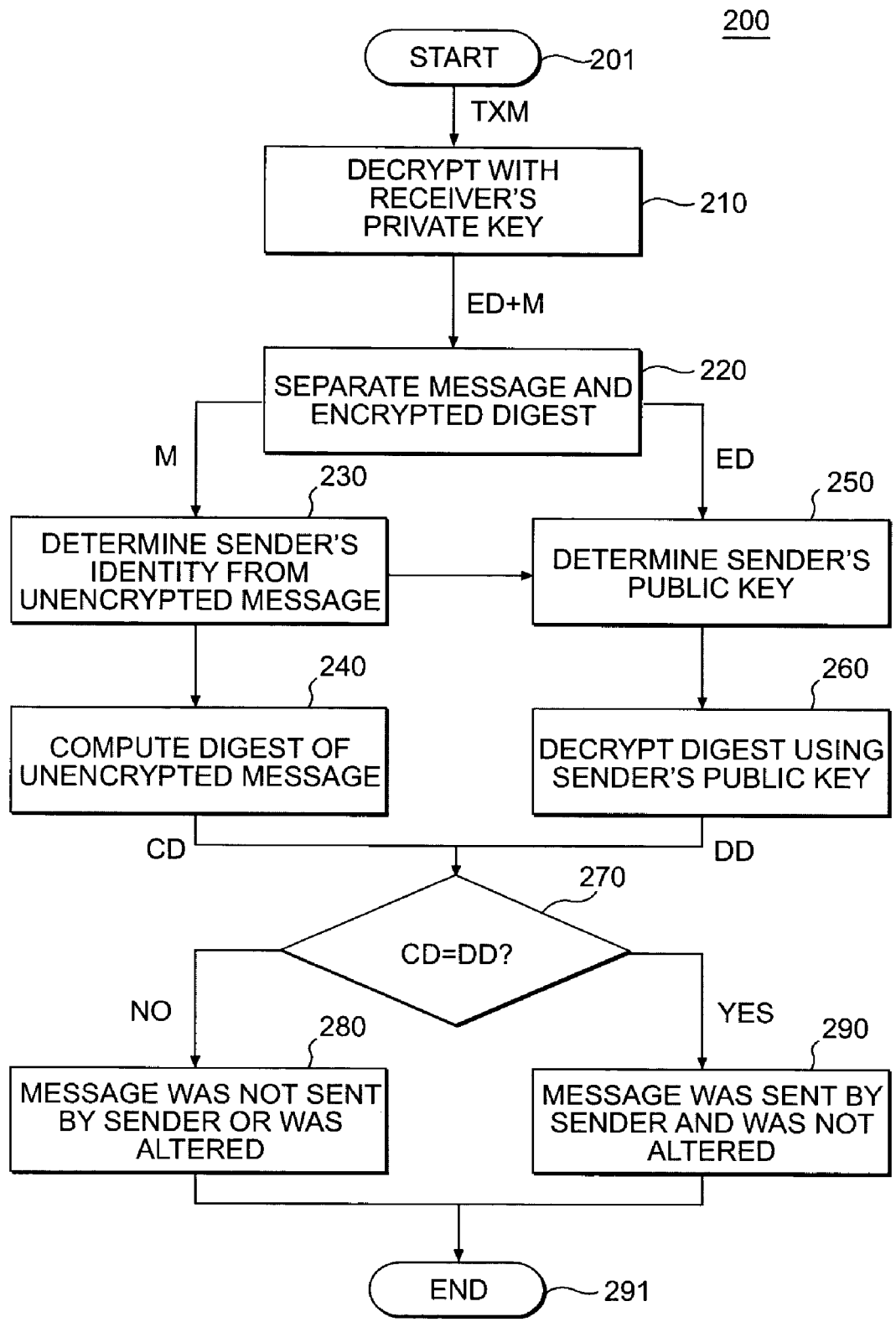
FIG. 3 is a flowchart illustrating a decryption process.

FIG. 3 is a flowchart illustrating a decryption process 200. The incoming encrypted message txm is first decrypted using the private key of the receiver in block 210. The result is a combination of the unencrypted message m and the encrypted message digest ed (i.e., ed+m). These two are separated in block 220. In block 230, the unencrypted message m may be used to determine the supposed identity of the sender. This information may be used in block 250 as described below.

In block 240, the text of the unencrypted message m is used to compute a message digest; the result is a computed digest cd. In block 250, the public key of the supposed sender is obtained. The identity of the supposed sender may be included in message m and determined in block 230. The identity is used, along with public key look-up table 50, to determine the public key to be used to decrypt ed. In block 230, the public key thus obtained is used to decrypt ed, thus providing a decrypted digest dd.

The computed digest cd, derived from the message m, is compared with the decrypted digest dd, derived from the digest computed by the sender. If cd and dd match, then the decryption of ed must have been successful, an occurrence which is possible only when the user who sent the message possessed the sender's primary key (the public key of the sender was used in the decryption of ed). Further, the message m could not have been altered, because the digest provided by the sender matches the digest computed by the receiver. The sending of a message with its digest in the foregoing manner, or in a similar manner providing the same end result, may be referred to as the use of a digital signature.

The practice of using digital signatures provides guarantees of authenticity for the public keys contained in public key lookup tables. Here, a trusted third party, often called the certificate authority (CA), digitally signs each public key in the lookup table. To make these digital signatures universally understandable, the ISO X.509 standard for public key certificate formatting is used. This X.509 standard calls for the inclusion of the following "fields" in a certificate: (a) the certificate serial number; (b) the certificate's validity dates; (c) the name of the issuer of the certificate (i.e., the CA); (d) the name of the owner of the public key; (e) the owner's public key; (f) the digital signature of the CA on parts (a) through (e). Thus, an X.509 certificate binds a user (or user name) to the user's public key with the CA's digital signature. This digital signature also makes it possible to verify that the data in the certificate has not been changed since it was signed (e.g., a user of the public key certificate should verify that the validity dates have not been changed). The CA self-signs the public key of the authority and inserts this certificate into the look-up table so that all other certificate signatures can easily be verified with the public key in the CA certificate.

In prior art PKI systems, certificate authorities usually provide a certificate revocation list (CRL) certificate in the lookup table. This CRL is a list of the certificate serial numbers of certificates that have been disavowed. The list is digitally signed and dated by the CA. Users of public keys from the lookup table can then check the CRL to ensure that the potential recipient of a message or sender of a digital signature is still in good standing.

A serious problem encountered with end-user cryptography lies with changing the certificates in the lookup table, such as removing previously granted cryptographic keys and adding new cryptographic keys. This problem can be illustrated within the context of cryptographic file systems. As noted above, such a cryptographic file system may be used to control access to certain files on a computer system that is accessible by several individuals. The files to be controlled may be referred to as encrypted files. Once a user has had access to a particular set of encrypted files, several prior art approaches exist for securely removing that access. These prior art approaches include: 1) changing the key-pair for the cryptographic file-set, 2) changing the symmetric encryption key for new writes, and 3) re-encrypting the entire file-set for which access rights have changed. Each of these approaches has drawbacks. Simply changing the key-pair that encrypts the symmetric file encryption key is not secure because no means exists for verifying that a user did not cache the symmetric file encryption key, which would allow access not only to previously stored information, but new information as well. Changing the symmetric encryption keys that are used for newly stored information provides some protection, but a user can still access all of the previously stored information in the cryptographic file-set. This solution has the additional disadvantage that there may eventually be many encryption keys needed to read a single file, which makes the system overly complex. The most secure solution is to re-encrypt the entire cryptographic file system when a user's access to the file-set is removed. While the most secure, this method is also very costly, especially if user access rights change frequently. A Secure Key Replacement Protocol (SKRP), as described below, provides a safe and convenient way to change access rights.

Figure 4A:
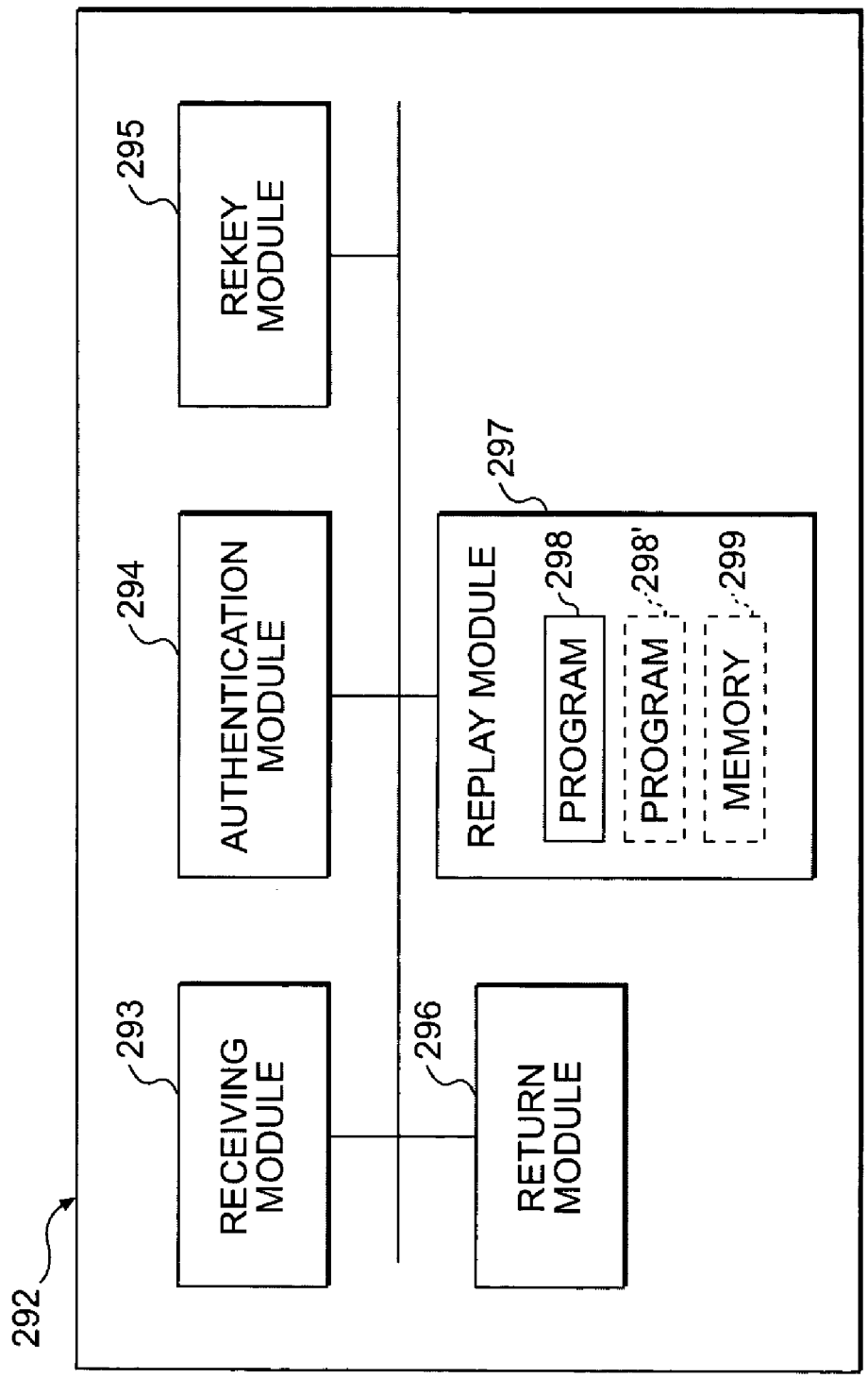
FIG. 4A illustrates an apparatus capable of executing a secure key replacement.

FIG. 4A illustrates an apparatus 292 capable of implementing the SKRP. The apparatus 292 may be configured as software, hardware, or a combination of software and hardware. The apparatus 292 may be implemented on a general purpose computer, on an application specific integrated circuit (ASIC), and on a specially-programmed computer for example. Elements of the apparatus 292 may be implemented on a magnetic card, a smart card, or a hardware token. In FIG. 4A, the apparatus 292 is shown comprising a receiving module 293 that receives and processes a secure key replacement (SKR) request. The SKR request includes an identity of a private key to be replaced, a SKR key to replace the private key, and a challenge that, when signed, indicates the private key is replaced with the SKR key. The apparatus 292 further includes an authentication module 294 that checks authenticity of the SKR request, a rekey module 295 that replaces the private key with the SKR key and signs the challenge, and a return module 296 that returns the signed challenge. The apparatus 292 also includes means 297 to prevent a replay attack. In an embodiment, the means 297 to prevent a replay attack includes a program 298, operable to read a time stamp on the SKR request and to compare the time stamp to a current time. In another embodiment, the means 292 to prevent a replay attack includes a memory 299 that stores identities of previously deleted private keys and a program 298' that compares the identity of the private key to be replaced with the identities of the previously deleted private keys.

Figure 4B:
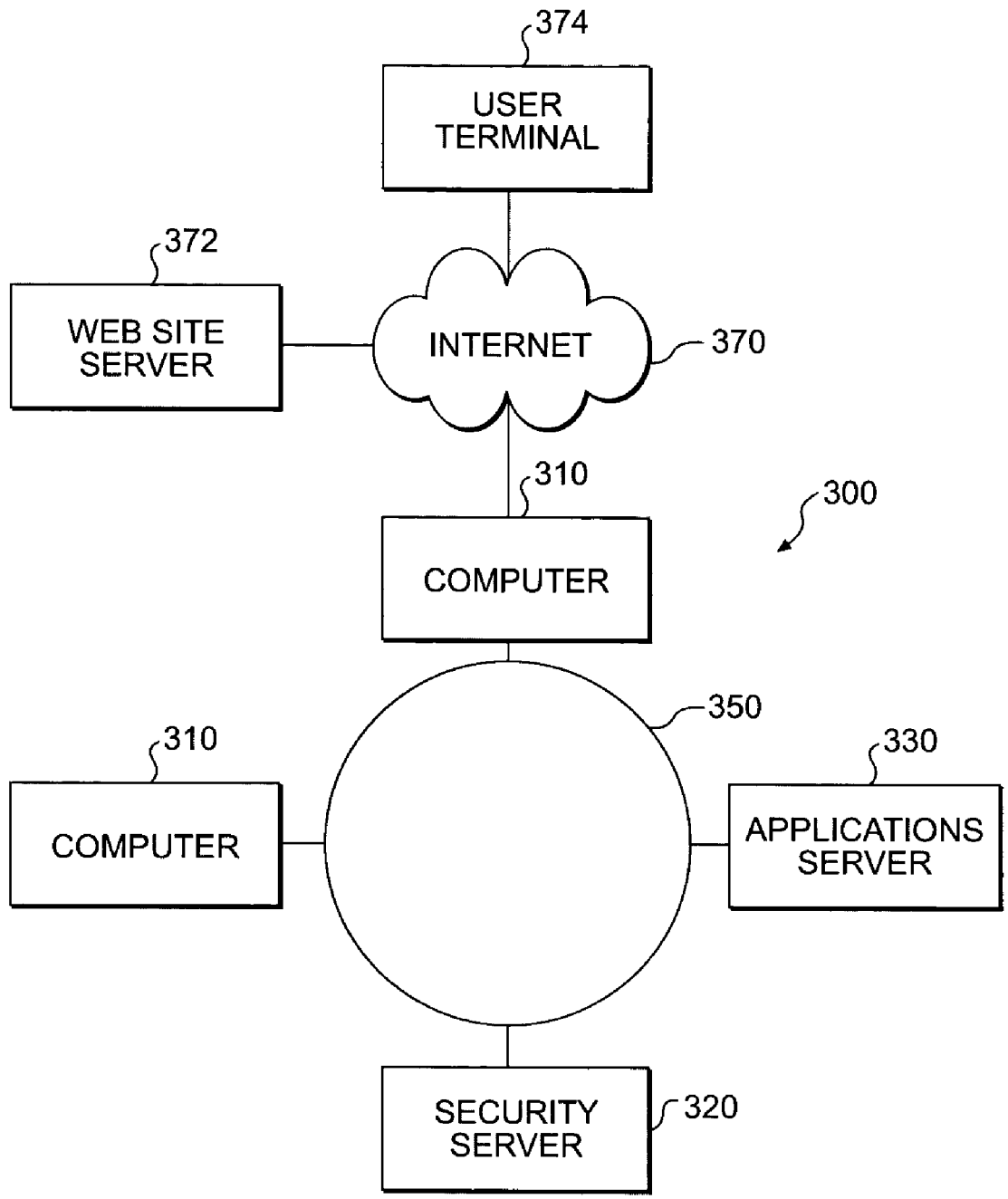
FIG. 4B illustrates a computer system upon which a secure key replacement protocol is implemented.

FIG. 4B illustrates a computer network 300 upon which the SKRP is implemented. The network 300 shown in FIG. 4B is intended to reflect a typical architecture of a private computer network, such as a local area network, that includes connections to the Internet. However, those of ordinary skill in the art will recognize that the features shown in FIG. 4B, and described below, would be equally applicable to other computer networks, standalone computers, and communications networks, including the Internet, for example.

The network 300 may include client computers 310, security server 320, and applications server 330, for example. The manner in which the network 300 communicates is treated herein at a high level, and the details are omitted for the sake of clarity. For more detailed information on such communications, reference may be made to Data and Computer Communications or to Local Networks, both by William Stallings, and both incorporated by reference in their entirety for their useful background information.

Finally, processes (including client processes, security server processes, and applications server processes), on a practical level, are supplied as software on any one of a variety of media. The software actually is or is based on statements written in a programming language. Such programming language statements, when executed by a computer, cause the computer to act in accordance with the particular content of the statements, thereby causing the defined process to run in a predetermined manner. Software may be provided in any number of forms including, but not limited to, original source code, assembly code, object code, machine language, compressed or encrypted versions of the foregoing, and any and all equivalents.

One knowledgeable in computer systems will appreciate that "media," or "computer-readable media," as used here, may include a diskette, a tape, a compact disc, an integrated circuit, a cartridge, a remote transmission via a communications circuit, or any other similar medium useable by computers. For example, to supply software that defines a process, the supplier might provide a diskette or might transmit the software in some form by satellite transmission, by a direct telephone link, or through the Internet.

Although such software instructions might be "written on" a diskette, "stored in" an integrated circuit, or "carried over" a communications circuit, for the purposes of this discussion, the computer usable medium will be referred to as "bearing" the software. Thus, the term "bearing" is intended to encompass the above and all equivalent ways in which software may be associated with a computer usable medium. For the sake of simplicity, therefore, the term "program product" is hereafter used to refer to a computer useable medium, as defined above, which bears software in any form.

The various computers and servers on the network 300 may communicate using messages in the transmission control protocol/internet protocol ("TCP/IP") format. The messages that are communicated through the network 300 are preferably TCP/IP messages and hypertext mark up language (HTML) documents. In one embodiment, the HTML documents sent through network 300 include embedded object oriented programming instructions, preferably in the JAVA.RTM. format. The messages sent through the network 300 may be sent in an encrypted or unencrypted form depending on the nature of the messages.

One of ordinary skill in the art will recognize that the network 300 may communicate using other forms of documents, which include tags or instructions therein. For example a form of "extended" HTML, or XML documents may be used in the network 300. For purposes of this description, all such forms of languages and variants which include documents, which documents include instructions therein shall be referred to as HTML documents. Likewise, while JAVA.RTM. is used in the described embodiment, other programming languages may be used. For example, ActiveX.TM. or other languages may be used in other embodiments. Further it should be understood that the instructions included in documents may be operative to cause a computer to access other documents, records or files at other addresses to obtain a program to carry out an operation.

In a particular application, the applications server 330 may store files that are accessible by the computers 310. Some of these files may be considered confidential, and access to these files may be restricted to selected users of the computers 310. Each of the computers 310 is operatively connected to communications bus 350 within the network 300. The communications bus may be wired or wireless, or both. Each device in the network 300 (i.e., the computers 310 and the servers 320, 330) has an appropriate hardware interface the enables the particular device to operate to carry out its respective functions in the network 300.

Also shown in FIG. 4B is a connection from the network 300 to the Internet 370. Coupled to the Internet 370 are web site 372 and user terminal 374.

Figure 5:
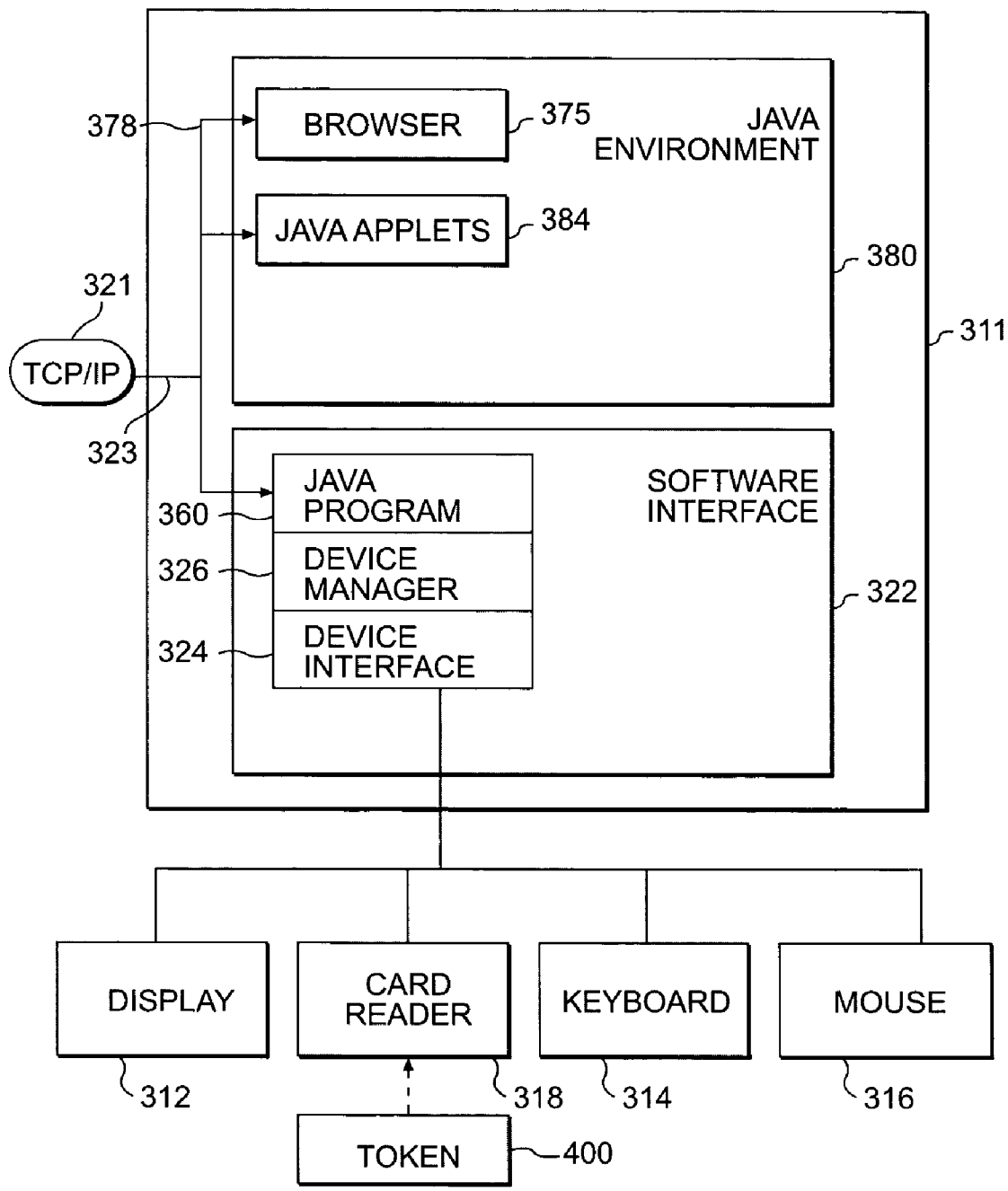
FIG. 5 illustrates details of a computer used with the computer system of FIG. 4B.

FIG. 5 illustrates details of the computer 310. The computer 310 allows for a variety of functions in the network 300. These functions include communications with the servers 320, 330 to access, manipulate, and save files, to communicate with other computers 310 in the network 300 by e-mail and other means, and to communicate with devices outside the network 300 (by e-mail, for example). The computer 310 includes a display 312, an input device (e.g., a keyboard) 314, a pointing device (e.g., a mouse) 316, and a card reader 318. The card reader 318 is configured to accept a token 400 or similar device (e.g., a magnetic card or a smart card) upon which is embedded the user's private key. The use of the token in the system 300 will be described in more detail later.

The computer 310 has several software programs that are executable therein. In an embodiment, these software programs include software interface 322. The software interface 322 preferably includes a software device interface 324 that communicates electronic messages with the communications bus 350. The software interface 322 also preferably includes a device manager 326. The device manager 326 is preferably operative to manage the various devices that comprise the computer 310 and to control their various states so as to be assured that they operate properly. The device manager 326 is also preferably operable to create device objects in the software so as to enable operation of the devices by at least one object oriented program 360. Software interface 322 also includes the object oriented program portion 360, which in one embodiment is an application written in the JAVA language. The JAVA program 360 works in conjunction with the device manager 326 to receive object oriented JAVA messages that cause the devices to operate, and to transmit device operation messages indicative of a manner in which devices are operating and/or are receiving input data.

The software interface 322 operates on computer 310 and communicates through a physical TCP/IP connection 321 with the intranet 370 (see FIG. 4B). The physical connection may be analog dial-up, serial port, ISDN connection or other suitable connection. In the configuration of the network 300 as shown, software interface 322 communicates at the IP address of computer 310 and at an IP port or socket 323 that is different from the other software applications.

Although in an embodiment, the interface 322 is software, in other embodiments, all or portions of the instruction steps executed by software interface 322 may be resident in firmware or in other program media in connection with one or more computers, which are operative to communicate with the various devices of the network 300. As described herein, all such forms of executable instructions shall be referred to as software.

Other software also operates in the computer 310. This software includes HTML document handling software that includes a browser 375. The browser 375 may be any known or later developed software program capable of operating over the network 300. The browser 375 communicates in computer 310 at an IP port 378.

The browser 375 is in operative connection with JAVA environment 380, which enables computer 310 to run JAVA language programs. JAVA language programs have the advantage that they operate the same on a variety of hardware platforms without modification. This "write once run anywhere" capability makes the JAVA environment well-suited for the described embodiment of the invention. However other embodiments may use different types of software programs.

The computer 310 also has executable software therein having a device application portion 384. The device application portion 384 contains executable instructions related to operation of the computer 310. In an embodiment, the device application portion 384 includes JAVA applets. Certain JAVA applets are operable to control and keep track of the status of the devices with which they are associated. Other applets are operable to configure the browser 375 to communicate messages. Still other applets manage security with respect to the network 300.

JAVA applets 384 run in a JAVA smartcard (not shown), which may be inserted into the card reader 318, or into a remote location. The browser 375 "talks" to the smartcard using a device API (not shown) such as PKCS #11 or CAPI, for example. This communication may be initiated when the browser 375 requires a user's print key, for example.

In an embodiment, the token 400 (or alternatively, a magnetic card or the smart card) input by a user includes indicia that corresponds to an address associated with the user in the computer network 300. In such an embodiment the indicia corresponds to a uniform resource locator ("URL") address that provides information on the computer network 300 where the user information resides, as well as a directory or subdirectory that includes the user information and the name of the document or resource that includes the user information. The URL address may be encoded on the user's token 400, card, or smart card. For example, the address may be encoded on track 3 of a magnetic stripe, in other locations within the magnetic stripe data or through encoding other readable indicia on the card. Alternatively, if the user's card is a smart card that includes semiconductor storage, the URL address associated with the user may be included as part of the stored data on the integrated circuit chip on the user's card. Alternatively, a URL could be derived from other data on the card by accessing a data base in which address data is correlated with other data read from the card. The data necessary to derive the address for accessing documents associated with a user could also be derived from inputs to input devices other than or in addition to card data, including for example biometric data that is input by a user through a biometric reading device. Such biometric data may include for example, data corresponding to one or more fingerprints, data from the user's appearance or combinations thereof.

For example, data input by a user such as through a card input to the card reader 318 may correspond to an address for accessing an HTTP record, which may be a file or document that includes information which can be used for verifying the identity of a user. This record could include data corresponding to a PIN number. The information may include biometric data corresponding to the authorized user of the card. The browser 375 may access the record and use the contents of the record such as data and/or instructions to verify that the indicia corresponding to biometric data in the record corresponds to the biometric data of the user entering the card. Alternatively, input data representative of appearance, voice, other features (or combinations thereof) or other input data, may be used to generate one or more addresses which correspond to a user, and the content of the record at the accessed address used to verify that the user at the computer 310 corresponds to the user associated with the record.

The delivery of the card data from a successfully read card is delivered responsive to the programming of the device application portion to a JAVA applet associated with notifying that the card data has been entered. In response, the JAVA applet operates to generate JAVA script which configures the browser 375 with the URL address corresponding to the data read from the card. The JAVA applet is also preferably operative to open a record that includes the user's URL address, the time and other card data. This record in a preferred embodiment may be stored in memory as data in an object in software. The object is preferably used to accumulate data as the transaction proceeds. The data stored in the transaction data object preferably includes data input through input devices by the user as well as data representative of operations carried out by transaction function devices.

Thus, by accessing the computer 310, a user can initiate transactions on the network 300. One such transaction involves production and modification of files or documents on the network 300. More specifically, the user may operate the computer 310 to create, modify, store, recall, and view documents that are stored as electronic files on the server 330. Some of these documents may be sensitive, and may be protected from general access by users of the network 300. In an embodiment, the means for limiting or otherwise controlling access to documents on the network 300 may be by way of the token 400, which incorporates PKI technology. The token 400 is designed to allow network administrators to change access status for any and all users of the network 300. The design feature that allows such flexible rekeying is termed herein as Secure Key Replacement Protocol (SKRP).

Figure 6:
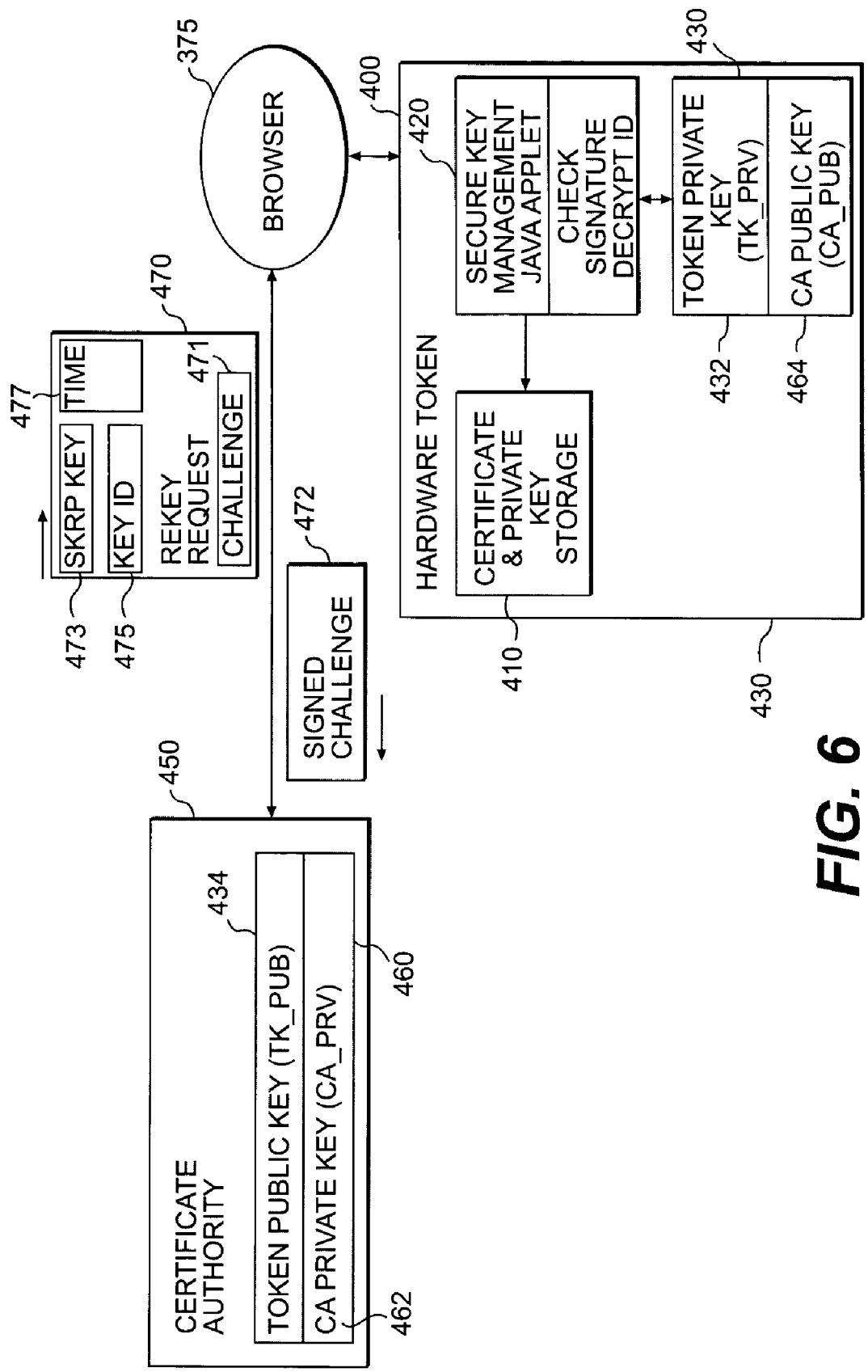
FIG. 6 illustrates an operation of the secure key replacement protocol.

FIG. 6 illustrates an operation of the SKRP. The hardware token 400 includes a certificate and private key storage 410, a secure key management JAVA applet 420, and a token key section 430 including a token private key (TK_PRV) 432 and a certificate authority (CA) public key (CA_PUB) 464. Information from the token 400 is transmitted over web browser 375 to certificate authority (CA) 450. The CA 450 may reside at the security server 320, or at an Internet web site, such as the web site 372 (see FIG. 4B). The CA 450 includes a certificate key section 460 having a token public key (TK_PUB) 434 corresponding to the token 400 and a CA private key (CA_PRV) 462.

The CA 450 initiates a private key update by issuing a rekey request 470. The private key update may take the form of deleting a previously authorized private key from the user's token, replacing the private key with an updated private key, or adding a new private key to the user's token. The rekey request 470 includes a challenge 471, a SKRP private key 473, and a key identifier 475 of the private key to be updated. The key identifier 475 of the private key to be replaced is the same as a key identifier of the SKRP private key 473. When an authentic rekey request for an existing key is processed, the private key is replaced with the SKRP private key 473, because the key identifier of the SSKRP private key 473 is identical to the key identifier of the private key to be replaced.

The SKRP relies on the user being able to certify that the user possesses a private key corresponding to a certificate signed by the CA 450. The SKRP user proves possession of the private key corresponding to the certificate signed by the CA 450 by signing the challenge 471 from the CA 450 with the new private key. Signing the challenge 471 from the CA 450 proves that the proper user possesses the new private key because the plain-text new private key can exist only on that particular user's token (e.g., the token 400). This functionality is provided by having the CA 450 encrypt the new private key with a public key whose corresponding private key exists only on the user's token 400. Only the trusted JAVA applet 420, on the proper user's token 400, is able to decrypt the new private key (and securely store the new private key on the token 400). Once stored, the new private key can be used to sign a challenge from the CA 450. The signed challenge 472 proves that the user's token 400 has received a rekey request, and has successfully decrypted and stored the new private key.

In the rekey request 470, the SKRP private key can be any 1024 bit random number, smaller than the modulus of the private key to be replaced (the private key does not have to be the result of an asymmetric key pair generation). Many implementations of PKI tokens and smart cards calculate the key identifier from the modulus, so the SKRP private key must keep the same modulus as the private key that the SKRP private key is replacing. Since the CA 450 will not have kept the original primes or Phi(n), it is not possible to invert the SKRP private key. This does not cause any problems, as the CA 450 can verify the signature on the challenge 471 by recalculating the signature itself (the CA 450 keeps a copy of the SKRP private key while the private key replacement process is taking place).

The SKRP allows the secure removal or updating of a private key that is stored on a user's token 400, and allows the addition of a new private key. To revoke or update a private key, the user first inserts the token 400 in any PKI enabled workstation (e.g., the computer 310). The SKRP key update procedures can be performed automatically each time the network 300 is accessed. The SKRP allows a remote CA, such as the CA 450, to verify that the private key was removed properly, even if the operation is performed on an untrusted computer. When the CA 450 receives the signed challenge 472, the CA 450 is assured that the private key that previously corresponded to the provided key identifier has been destroyed. The JAVA applet 420 removes the SKRP private key 473 from the token 400, making room for more private keys to be stored in the storage 410. The SKRP private key holds no value after the rekey protocol is complete.

The SKRP could be susceptible to compromise through a "replay attack." A replay attack occurs when a message that originally was used to place a private key on the token 400 is replayed on the computer 310. For example, after the SKRP rekey request is processed, an original secure key replacement protocol message could be replayed to the token 400. If no means existed to detect a replayed message, a deleted private key could be restored. As a consequence, the SKRP includes means to prevent this replay attack. In an embodiment, a time stamp 477 is placed on each of rekey request 470 or other secure remote rekey protocol message. The JAVA applet 420 on the token 400 is designed to not accept the rekey request 470 if the origination time (which is in the signed rekey request 470 from the CA 450) is significantly different from a real-time clock on the token 400. For example, if the origination time of the rekey request 470 is greater than 24 hours from the real-time clock on the token 400, then the JAVA applet 420 will not accept the rekey request 470. The time difference could also be greater than or less than 24 hours. This embodiment has the advantage that no additional information needs to be stored on the token 400.

In an alternative embodiment, the token 400 stores the key identifier for all previously deleted keys. With this information, old keys cannot be reloaded, as the token 400 will not allow reloads for a previously deleted key identifier. This embodiment requires that 8 to 16 bytes be stored for each private key the token 400 has ever securely stored.

Figure 7:
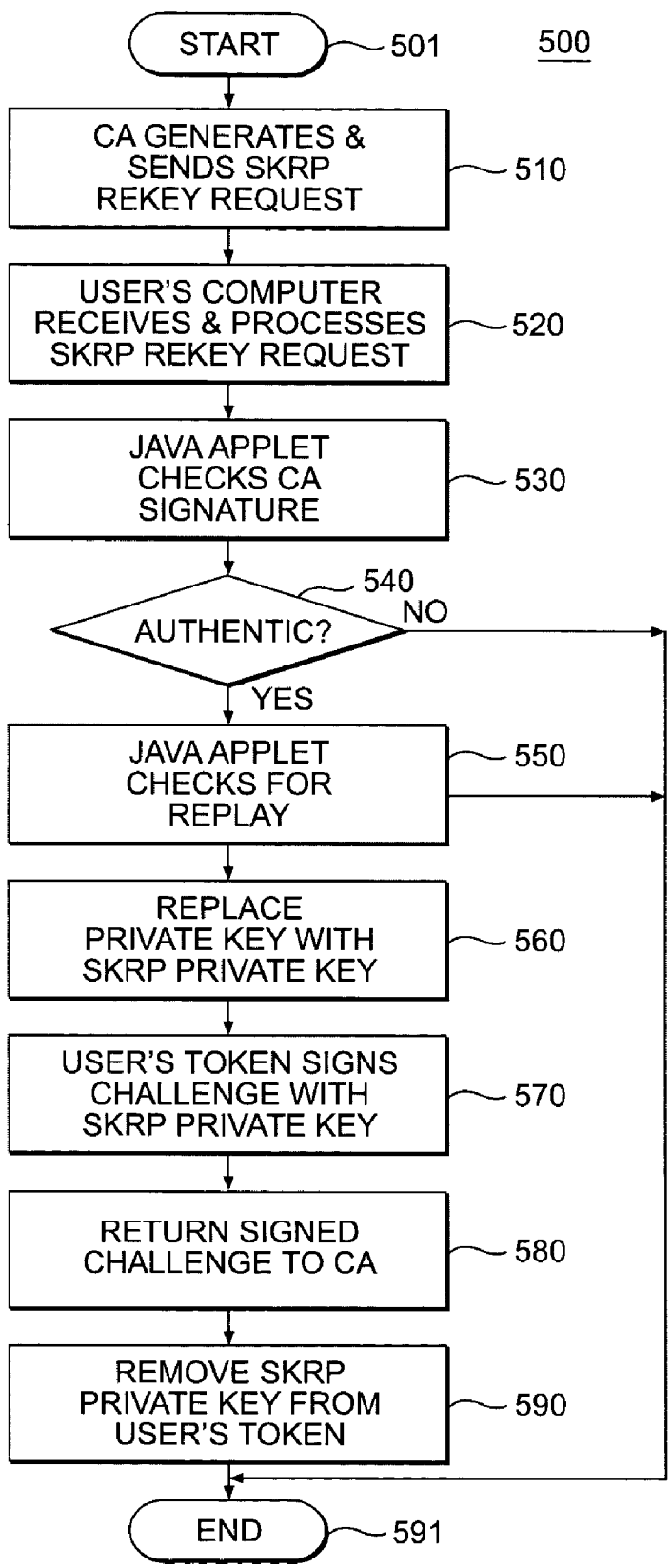
FIG. 7 is a flowchart illustrating an embodiment of a secure key replacement.

FIG. 7 is a flowchart illustrating a secure rekey replacement protocol 500, as executed on the network 300 of FIG. 5. The protocol 500 begins in block 501. In block 510, the CA 450 generates a SKRP rekey request 470. The rekey request 470 includes the challenge 471, the SKRP private key 473, and the key identifier 475 of the private key to be replaced. The CA 450 sends the rekey request 470 to the computer 310. In block 520, the computer 310 receives and processes the rekey request 470. In block 530, the JAVA applet 420, loaded on the token 400, verifies that the rekey request 470 is authentic by comparing the signature on the rekey request 470 to the CA's signature stored on the certificate & private key storage 410.

Figure 8A:
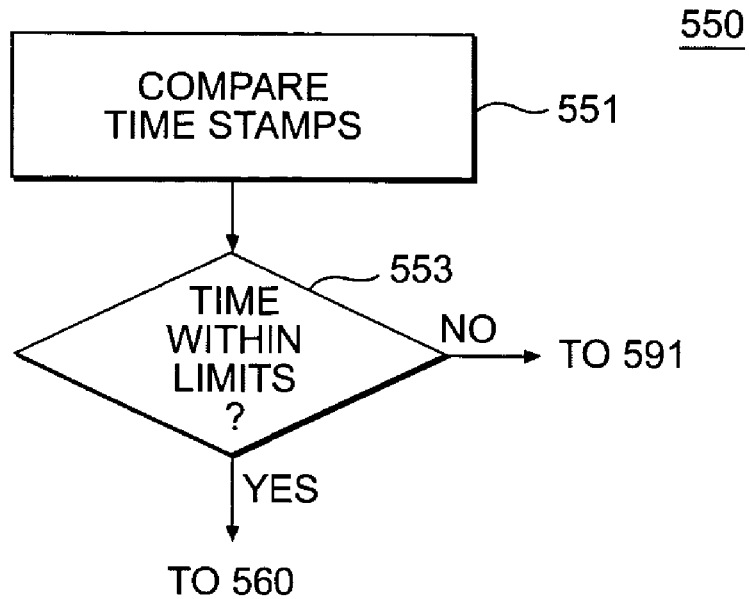
FIGS. 8A and 8B are flowcharts illustrating alternative embodiments for preventing a replay attack.
Figure 8B:
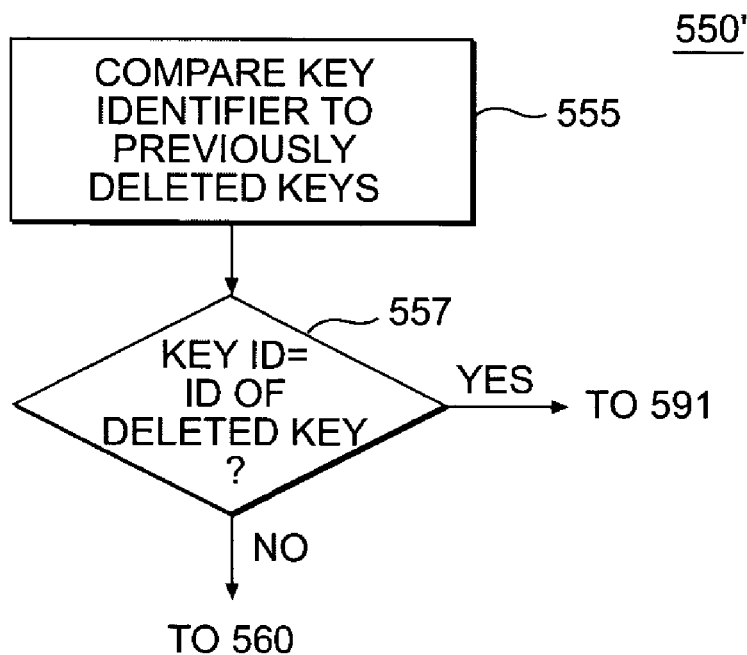

In block 540, if the rekey request 470 is authentic, the protocol 500 proceeds to block 550. If the rekey request 470 is not authentic, the protocol 500 ends, block 591. In block 550, the JAVA applet 420 determines if the rekey request 470 is a replay of a previous rekey request 470. The protocols for determining if the rekey request 470 is a replay are illustrated in FIGS. 8A and 8B. In block 560, following processing of the rekey request 470 (i.e., following blocks 530-550), the private key is replaced with the SKRP private key 473. In block 570, the user's token 400 signs the challenge 471 from the CA 450 with the SKRP private key 473. In block 580, the signed challenge 472 is returned from the computer 310 to the CA 450. When the CA 450 receives the signed challenge 472, the CA 450 is assured that the private key that previously corresponded to the provided key identifier 475 has been destroyed. In block 590, the JAVA applet 420 removes the SKRP private key 473 from the token 400. In block 591, the SKRP 500 ends.

FIGS. 8A and 8B are flowcharts illustrating alternative embodiments of protocols for preventing a replay attack. In FIG. 8A, protocol 550 is illustrated to include, at block 551 comparing the time stamp 477 recorded on the rekey request 470 to a current time on the computer 310. In block 553, if the time difference is within limits, the protocol 500 continues with processing shown in block 560. If the time difference exceeds the limit, the rekey request 470 is ignored at the computer 310, and the protocol 500 ends, block 591.

FIG. 8B illustrates an alternative protocol 550' for preventing a replay attack. The protocol 550' relies on the token 400 storing the key identifier for all previously deleted private keys. With this information, old private keys cannot be reloaded, because the token 400 will not allow reloads for a previously deleted key identifier. In block 555, the key identifier of the SKRP private key 473 is compared to the key identifiers of all previously deleted keys. In block 557, the token 400 determines if the key identifiers match. If the key identifiers do not match, processing continues with block 560. If the key identifiers match, the rekey request 470 is rejected, and processing ends, block 591.

We claim:

1. A secure key replacement (SKR) method executed on a suitably programmed device, comprising:
   receiving a rekey request, wherein the rekey request identifies a private key for replacement, the rekey request, comprising:
   a SKR key, and
   a challenge;
   authenticating the rekey request;
   replacing the identified private key with the SKR key;
   signing the challenge with the SKR key;
   returning the signed challenge; and
   preventing a replay attack, comprising:
   storing key identifiers of previously deleted private keys in memory,
   reading a key identifier of the private key,
   comparing the read key identifier to the key identifiers of previously deleted private keys, and
   rejecting the key request if the read key identifier matches any of the key identifiers of previously deleted keys.

2. The secure key replacement method of claim 1, wherein the rekey request is received at a removable device.

3. The secure key replacement method of claim 2, wherein the removable device comprises one of a magnetic card, a smart card, and a token.

4. The secure key replacement method of claim 2, wherein the removable device is coupled to a user's computer.

5. The secure key replacement method of claim 1, wherein the rekey request is received at a user's computer.

6. The secure key replacement method of claim 1, further comprising deleting the identified private key.

7. The secure key replacement method of claim 1, wherein preventing a replay attack, comprises:
   determining a time stamp on the rekey request;
   comparing the time stamp to a current time; and
   rejecting the rekey request when the time stamp differs from the current time by a specified limit.

8. The secure key replacement method of claim 7, wherein the specified limit is 24 hours.

9. The secure key replacement method of claim 1, wherein receiving the rekey request comprises receiving the key request from a certificate authority, and wherein returning the signed challenge comprises returning the signed challenge to the certificate authority.

10. The secure key replacement method of claim 9, wherein the certificate authority is located at an Internet web site.

11. The secure key replacement method of claim 1, wherein authenticating the key request comprises checking a digital signature of the key request.

12. The secure key replacement method of claim 1, wherein the private key allows access to one or more documents.

13. The secure key replacement method of claim 1, wherein the private key allows execution of transactions comprising one of on-line banking, on-line purchasing, and viewing web site content.

14. A method, executed by a suitably programmed device, for secure replacement of private keys, comprising:
   sending a rekey request to a user terminal, the rekey request comprising:
   identifiers of one or more private keys to be replaced,
   secure key replacement protocol (SKRP) keys to replace the private keys, and
   a challenge to be signed at the user terminal, wherein a private key is replaced with a SKRP key and wherein the challenge is signed with the SKRP key;
   receiving the signed challenge; and
   preventing a replay attack, comprising:
   storing key identifiers of previously deleted private keys in memory,
   reading a key identifier of the private key,
   comparing the read key identifier to the key identifiers of previously deleted private keys, and
   rejecting the key request if the read key identifier matches any of the key identifiers of previously deleted keys.

15. The method of claim 14, wherein the rekey request further comprises a time stamp, wherein the time stamp is compared to a current time at the user terminal.

16. The method of claim 14, wherein sending the rekey request comprises sending the rekey request from an Internet web site.

17. The method of claim 14, wherein the user terminal is a node on a computer network, and wherein sending the rekey request comprises sending the rekey request from another node on the computer network.

18. The method of claim 14, wherein the private keys are stored on a removable device, the removable device adapted for insertion into the user terminal, further comprising receiving an indication from the user terminal when the removable device is inserted into the user terminal.

19. An apparatus comprising computing devices having programming that provides secure key replacement (SKR), the programming comprising:
   a receiving module that receives and processes a SKR request, the SKR request comprising:
   an identity of a private key to be replaced, a SKR key to replace the private key, and a challenge that, when signed, indicates the private key is replaced with the SKR key;

an authentication module that checks authenticity of the SKR request; a rekey module that replaces the private key with the SKR key and signs the challenge;

a return module that returns the signed challenge; and prevention means to prevent a replay attack, comprising:

a memory that stores identities of previously deleted private keys, and a program that compares the identity of the private key to be replaced with the identities of the previously deleted private keys and rejects the SKR request if the identity of the private key to be replaced matches any of the identities of the previously deleted keys.

20. The apparatus of claim 19, wherein the SKR request further comprises a time stamp indicative of a time of issuance of the SKR request, and wherein the prevention means, comprises:

a program, operable to read the time stamp on the SKR request and to compare the time stamp to a current time.

21. The apparatus of claim 19, wherein the receiving module, the authentication module, the rekey module and the return module are implemented on a removable device capable of insertion into a user terminal.

22. The apparatus of claim 21, wherein the removable device is one of a magnetic card, a smart card, and a token.

23. The apparatus of claim 21, wherein the user terminal is a computer operating in a communications network, and wherein the SKR request is provided by a certificate authority coupled to the communications network.

* * * * *